United States Patent [19]

Martin et al.

[11] 3,877,980

[45] Apr. 15, 1975

[54] METHODS OF PRODUCING PHOSPHOSILICATE GLASS PATTERNS

[75] Inventors: Barry Forester Martin; Edward David Roberts, both of Salfords, near Redhill, Surrey, England

[73] Assignee: U.S. Philips Corporation, New York, N.Y.

[22] Filed: Jan. 17, 1973

[21] Appl. No.: 324,394

[30] Foreign Application Priority Data

| | | |
|---|---|---|
| Jan. 18, 1972 | United Kingdom | 2350/72 |
| May 4, 1972 | United Kingdom | 20759/72 |
| May 4, 1972 | United Kingdom | 20760/72 |

[52] U.S. Cl. ........................ 357/7; 357/10; 427/38; 427/43

[51] Int. Cl. .............................................. B44d 1/18

[58] Field of Search ......... 117/212, 40, 93.3, 123 B, 117/12 S

[56] References Cited

UNITED STATES PATENTS

| | | | |
|---|---|---|---|
| 3,055,776 | 9/1962 | Stevenson et al. | 117/212 |
| 3,760,242 | 9/1973 | Duffy | 117/212 |

*Primary Examiner*—John D. Welsh
*Attorney, Agent, or Firm*—Frank R. Trifari; Norman N. Spain

[57] ABSTRACT

Disclosed is a method of producing a phosphosilicate glass layer pattern on a substrate using a polysiloxane having phosphorous added thereto and devices having a layer pattern thus made.

35 Claims, 23 Drawing Figures

METHODS OF PRODUCING PHOSPHOSILICATE GLASS PATTERNS

Figure 1:
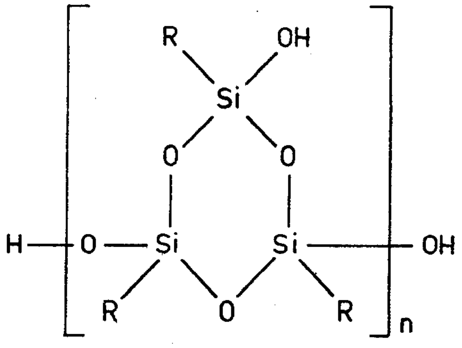

The present invention relates to a method of producing a phosphosilicate glass layer on a substrate according to a predetermined pattern. The invention further relates to a device, more specially a semiconductor device, having a layer pattern thus made.

Especially in semiconductor device technology it is known to use patterns consisting of silica, as a diffusion mask during the manufacture of a semiconductor device or as a passivating layer on a semiconductor device. According to known technics the layer may be obtained by deposition, for instance from the gas phase by means of chemical reactions, such as decomposition of gaseous siloxanes or reaction between silanes or halogenated silanes with oxygen, or by sputtering. In the manufacture of silicon devices oxidation of silicon is frequently used. In these cases the pattern is obtained by covering the layer thus formed by a photoresist pattern and etching off the exposed oxide layer portions.

In semiconductor devices in which silica is used as a passivating layer, instability has been observed which has been attributed to the presence within the passivating layer of moveable charges, particularly positive ones, such as sodium ions. It is probably impossible to eliminate traces of such materials during fabricating processes, but methods of minimizing their undesirable effects have been devised. A common method of achieving this is to cover the passivating layer with a thin layer of phosphosilicate glass, which apparently prevents the charges moving when an electric field is applied. In conventional processing of semiconductor devices, the silica passivating layer on the semiconductor is reacted with a phosphorus compound to form a surface glass layer in which contact windows are opened by etching.

In cases a phosphorus diffusion in the semiconductor has to be carried out using silica masking, these surface glass layers may be formed without a separate step. For sufficiently masking during the phosphorus diffusion, the silica has to be given a sufficient thickness which will result in a combined phosphosilicate glass-silicate layer of at least said thickness. It is often desired to have a passivating layer prepared in a later stage of manufacturing semiconductor devices. Also it may be desirable to have, at least locally, thin passivating layers of high stability, for instance for use in metal-oxide-semiconductor structures, such as MOS-transistors of MOS capacitors, in which the sensitivity increases when decreasing the thickness of the oxide layer.

Further, in normal technics of making phosphate glass patterns the pattern has to be made by using photoresist 20 and etching with the use of such layers. The resolution of the pattern may be detrimentally influenced by underetching.

An object of the present invention is the manufacture of phosphosilicate glass layer pattern in which the pattern may be made at substantially low temperatures.

As is known a polysiloxane layer may be made in a desired pattern and then be converted into silicon oxide. The pattern may be made by locally irradiating a layer of a material for forming the said pattern. The irradiation is carried out with an electron beam.

The layer to be irradiated may be already in a prepolymerised form. Due to the irradiation local polymerization may occur. Suitable liquids are used which act differently upon irradiated and unirradiated layer portions such that layer portions of one of the two types of layer portions is removed entirely leaving at least part of the thickness of the layer portions of the other type.

In Applicants' co-pending application U.S. Pat. Application Ser. No. 234,193 filed Mar. 13, 1972 corresponding with British application 6884/71, the use of a polysiloxane mixture comprising siloxane ring structures is described for producing silicon oxide patterns by local irradiation with electron beams. The irradiated portions are more readily attacked by fluoric acid solutions than the unirradiated portions. Apparently the structure having more cross-links due to the irradiation is more readily attacked than the unchanged portions. As will be described hereinafter, it is also possible to use solvents with which the unirradiated portions may be removed selectively.

Although with the polycyclosiloxane material described in the copending application a silica pattern may be manufactured of a quality comparable with silicon oxide patterns made by other, more usual methods, it shows also comparable disadvantages such as instability.

It was now found by the inventors that it is possible to form polysiloxane layers in which phosphorus is incorporated. It was also found that such layers may be obtained in a desired pattern. It was further found that such layers may be converted to phosphosilicate glass.

According to the invention a method of producing a phosphosilicate glass layer on a substrate according to a predetermined pattern in which polysiloxane is used which forms a layer comprising polysiloxane which layer is confined to the predetermined pattern, is characterized in that phosphorus is added to the polysiloxane and the resulting layer pattern comprising polysiloxane and phosphorus is converted into the phosphosilicate glass layer pattern.

The method according to the invention is especially suitable for use in the manufacture of semiconductor devices. To this end a substrate is preferably used comprising a semiconductor, especially silicon, although, in view of the possibility of using relatively low temperatures in providing the material for the phosphosilicate glass layer, substrates comprising other semiconductors, for example germanium and semiconductors of the III–V type may also be used.

For manufacturing a pattern of phosphosilicate glass on silica the layer pattern comprising polysiloxane and phosphorus is preferably formed on a substrate having at least locally a layer of silicon oxide. Said layer of silicon oxide is preferably formed by a material convertable to silicon oxide.

According to another embodiment, the layer pattern comprising polysiloxane and phosphorus is formed on a substrate having at least locally a layer of a material convertable to silicon oxide. In any of the two latter cases said convertable material preferably comprises polysiloxane. The above substrate layer is preferably formed according to a predetermined pattern before the formation of the layer pattern comprising polysiloxane and phosphorus. The superposed patterns may be substantially congruent although the two patterns may also differ from each other and may be superposed only locally.

Preferably any of the patterns mentioned before is obtained by using local irradiation. Preferably local irradiation with an electron beam is used. Especially such irradiation may act directly on polysiloxane which behaves differently against removal with a suitable liquid in case it has been exposed to the irradiation than in case it has not been exposed to such irradiation.

In any of the above cases in which polysiloxane is used, preferably polysiloxane comprising cyclosiloxane rings is used, e.g., comprising cyclotrisiloxane rings and/or cyclotetrasiloxane rings. The silicon atoms of the rings are preferably bonded to aliphatic groups. With such ring structures the silicon content is high while in the meantime the material is not very hard. Due to a high silicon content, shrinkage during the conversion to silicon oxide is limited. In this respect, the use of short aliphatic groups as methyl, ethyl and vinyl groups are preferred. Further, for obtaining a dense structure of the rings at least part of the rings are preferably bonded to each other by oxygen bridges. A very suitable polysiloxane material is an at least partly polymerized mixture of 2,4,6-tri-organyl, 2,4,6 trihydroxy cyclotrisiloxane and 2,4,6,8-tetra-organyl, 2,4,6,8-tetra-hydroxy cyclotetrasiloxane in which part of the hydroxy groups bonded to opposing silicon atoms in the cyclotetrasiloxane rings may be replaced by oxygen bridges and the organyl groups are aliphatic groups.

According to a preferred embodiment, the layer comprising polysiloxane and phosphorus is obtained by introducing the phosphorus in an already deposited polysiloxane layer. Said phosphorus may suitably be introduced from the gaseous phase. Another suitable way of introducing the phosphorus is from a liquid phase.

The phosphorus is preferably used in the form of a halogen compound. Good results were obtained with phosphorus oxychloride for introducing the phosphorus.

Preferably the polysiloxane layer is already confined to the predetermined pattern before introducing phosphorus into it.

According to another preferred embodiment the phosphorus is codeposited with the polysiloxane onto the substrate. Preferably the phosphorus is applied in the form of a compound. In said compound phosphorus is preferably bonded to oxygen. Preferably the compound comprises also silicon. The use of organic groups in the compound is preferred. Said organic groups are preferably aliphatic groups. Said aliphatic groups are preferably small and may be chosen from the class of methyl, ethyl and vinyl groups. The organic groups are preferably bonded to silicon. Good results have been obtained when the compound consists of tri-(di-organosilylene) diphosphate, in which "organo" stands for the organic groups.

As is stated before, the invention is especially useful for forming a phosphosilicate glass layer pattern on a silicon oxide layer pattern. It is further already emphasized that it may be desirable to provide the layer comprising polysiloxane and phosphorus on a layer of polysiloxane which was given already its predetermined pattern. In these case normally two masking operations are required, one for obtaining the polysiloxane layer pattern of the substrate and one for obtaining the layer pattern of the polysiloxane comprising the added phosphorus. Especially in case the two patterns are congruent and the second one should exactly cover the first one, an exact alignment of the maskings may give problems. However, a preferred embodiment is found in which the congruent pattern may be obtained by using only one masking operation. According to the last-mentioned preferred embodiment the substrate is formed with a layer pattern comprising polysiloxane subjected to irradiation according to said layer pattern after which the codeposition of polysiloxane and phosphorus is performed onto the substrate and the codeposited material is further polymerized according to the underlying irradiated layer pattern by graft-polymerization induced by the irradiated material of the polysiloxane underneath said layer after which the portions of the codeposited layer not overlying the irradiated pattern which were not subjected to the graft-polymerization are removed. Graft-polymerization means polymerization induced by seeding. In the present case seeding is obtained by the irradiated polysiloxane underneath the codeposited layer. The irradiated material seems to be in a form in which it activates polymerization. In this respect it is not absolutely necessary that the unirradiated siloxane was removed from the substrate before the codeposition.

The above graft-polymerization is enhanced when the polysiloxane codeposited with the phosphorus comprises vinyl groups. The graft-polymerization is preferably carried out in an oxygen-free atmosphere An oxygen-free atmosphere should be understood to mean herein an atmosphere which is substantially free of oxygen in elemental form a well as in compound form.

The invention further relates to a device, more especially a semiconductor device comprising phosphate glass layer pattern as produced according to the invention.

The invention will further be described in more detail with the aid of some Examples and with reference to the accompanying drawing.

Referring to the drawings, FIGS. 1–4 and 13 show usable polysiloxane materials. FIGS. 5–12 and 14–23 depict various stages in the manufacturing process.

The first two examples are embodiments showing producing a phosphosilicate glass layer superimposed upon a silica layer on a substrate, comprising the steps of applying a layer comprising a polysiloxane mixture as hereinafter specified to the substrate, irradiating the layer with an electron beam which penetrates through the layer in accordance with a predetermined pattern, subsequently developing the layer until a siliceous film in accordance with the pattern remains on the substrate and all unirradiated material has been washed away, then heating the siliceous film so as to decompose the organic material and leave the apertured silica film on the substrate, then depositing a coating of a mixture of a polysiloxane mixture as hereinafter described and a tris-(diorgano-silylene) diphosphate as hereinafter described over the substrate bearing the silica pattern, irradiating the coating of the mixture with an electron beam which penetrates through the coating in accordance with the pattern, developing the coating so as to leave a coating containing phosphorus, silicon, oxygen and organic groups coincident with the silica film and then heating the developed coating so as to form the phosphosilicate glass layer. The atomic ratio of Si to P in the coating is from 49:1 to 9:1, more specifically from 24:1 to 13:1.

Through the following examples the polysiloxane mixture is a mixture of poly-oxy(2,4,6-trialkyl-2-hydroxy-cyclotrisiloxan-4,6-ylenes) and poly-oxy-(2,4,6,8-tetraalkyl-2,6-dihydroxycyclotetrasiloxan-4,8-ylenes) in which some of the units have the oxy- (2,4,6,8-tetraalkyl-2,6-epoxy-cyclotetrasiloxan-4,8-ylene) form. The general structure of these rings and of this unit are shown respectively in FIGS. 1, 2 and 3 of the accompanying diagrammatic drawings, *n* having values from 1 to 6 and R representing a methyl, vinyl, or ethyl group or a random mixture of methyl and vinyl groups. The tris-(diorgano-silylene) diphosphate is a compound having the general formula shown in FIG. 4 of the accompanying diagrammatic drawing, wherein Q represents methyl, ethyl or vinyl.

The siliceous film may be heated in an oxidizing atmosphere.

It has been found that the above-described polysiloxane mixtures can be used to make silica films by electron beam techniques which serve as satisfactory passivating layers. The film produced by simple electron exposure and development still contains some organic residues and these give rise to hysteresis effects in C-V characteristics of MOS capacitors made from these films. The organic residues are almost completely eliminated together with the hysteresis effects if the films are heated for 15 minutes in wet oxygen at 650°C. Still further improvement is obtained if the films are subsequently heated in nitrogen, at 800°C. The silica film produced by irradiation of the polysiloxane mixture is almost indistinguishable after these heat treatments from the so called "wet thermally grown silica" employed in conventional processing. It does, however, still contain some movable charges which are manifested by a shift along the voltage axis of C-V curves of MOS capacitors subjected to bias-temperature treatments. The shift is consistent with the presence of movable positive charges. The application of a phosphosilicate glass pattern, defined by the electron beam, overcomes the effect of these charges in the same way as in conventional processing. Electron beam irradiation of the layer may be performed in an atmosphere having a partial pressure of 0 to 5 millitorrs of oxygen.

In the following Examples 1 and 2, reference is made to the accompanying drawings in which FIGS. 5 to 12 schematically show successive stages in producing a phosphosilicate glass layer superimposed upon a silica passivating layer.

EXAMPLE I

A 25% by weight solution of a polysiloxane mixture in methyl isobutyl ketone was prepared by hydrolyzing methyltrichlorosilane using the method described in our co-pending application PHB 32,131.

A silicon slice 1 was cleaned by oxidizing the slice, then removing the oxide by immersion in a hydrofloric acid solution followed by two 15 minute immersions in freshly prepared solutions which consisted of equal volumes of concentrated sulphuric acid (98% by weight) and a 30% by weight solution of hydrogen peroxide one volume of which when decomposed produces 100 volumes of oxygen gas at atmospheric pressure. The slice was then rinsed in deionized water and was spun dry.

The slice 1 was coated with a 5000A thick layer 2 of the polysiloxane mixture by applying the above-mentioned solution of the polysiloxane mixture on to the slice 1 from a syringe and spinning the slice at 5,000 r.p.m. so as to remove the excess of the mixture and allowing the thin film so applied to dry. The layer 2 was irradiated with a 9keV electron beam in accordance with pattern defined by a mask 3 until the exposure was 250$\mu$ C per sq. cm. The apparatus used for the electron beam irradiation was of the types described in "High resolution electron beam techniques for transistor fabrication" by J. M. S. Schofield, H. N. G. King and R. A. Ford (P.561) and "Rapid direct formation of siliceous diffusion barriers by electron beams" by E. D. Roberts (P.571) at the 3rd International Conference on Electron and Ion Beam Service and Technology, Electrochemical Society Meeting, Boston, May 1968. Unirradiated portions 4 of the layer 2 were removed by rinsing with acetone, the slice being spun dry, producing the arrangement shown in FIG. 7. The slice 1 bearing the irradiated portions 5 was heated for 15 minutes at 650°C in oxygen which had been saturated with water vapour at 90°C and was subsequently heated for 15 minutes in dry nitrogen at 800°C so that the irradiated portions 5 were converted into silica portions 5*a*.

The tris-(diorganosilylene) diphosphate is prepared by the following method which is essentially that described by M. G. Voronkov and V. N. Zgonnik in Zhur, Obshchei Khim. 27, 1483–6 (1957). 18.45 parts by weight of di-organo-dichlorosilane was stirred in a flask fitted with a reflux condenser. Ten parts by weight of 90% phosphoric acid was added dropwise over about an hour, during which the mixture gradually increased in viscosity and hydrogen chloride was envolved through the condenser. The mixture was heated and stirred for 6 hours, the flask being immersed in boiling water meanwhile, and more hydrogen chloride was evolved. The apparatus was then evacuated to a pressure about 3mms Hg and maintained at 100°C for another 4 hours. The product was free from chlorine and was dissolved in methylated spirit to give a 25% w/w solution.

A 25% by weight solution of tris-(dimethylsilylene) diphosphate in methylated spirit was prepared. 1gm of this solution was mixed with 7 gms of the 25% by weight solution of the polysiloxane mixture and 24 gms methyl isobutyl ketone. The slice 1 and silica portions 5*a* were provided with a 1000 A thick coating 6 of a mixture of the polysiloxane mixture and the tris-(dimethylsilylene) diphosphate by coating the slice 1 and portions 5*a* with this mixed solution and removing the excess material by spinning at 6000 r.p.m. The coating 6 was irradiated by either of the methods described above with 9 keV electrons to an exposure of 1,000$\mu$ C per sq. cm., in accordance with a predetermined pattern so that portions 7 of the coating 6 were irradiated, which portions 7 coincide with the silica portions 5*a*. The slice 1 was rinsed with methylated spirits so as to remove the unirradiated portions of the coating 6, leaving irradiated portions 7 which consisted of a phosphorus-containing siloxane material. The slice was spun dry, heated for 15 minutes at 650°C in oxygen saturated with water vapour at 90°C, then in dry nitrogen for 15 minutes at 800°C and finally for 15 minutes at 1,050°C. These heat treatments produced phosphosilicate glass portions 8 on the silica portions 5.

Small capacitors were made from the coated slice so produced, by evaporating an aluminium electrode on to the coating 8, the silicon slice 1 serving as the other electrode. The capacities were measured on a 150 kHz bridge with varying D.C. bias voltages applied. No hysteresis effects were observed during D.C. bias voltage cycles. The capacity - D.C. bias voltage curves did not change when the capacitors were baked at 180°C for 30 minutes with ±9 volts D.C. applied across the capacitor. A marked change in the CV curves occurs under these conditions if the phosphosilicate glass coating 8 is omitted.

EXAMPLE II

A slice 1 was provided with silica portions 5 in the manner described in Example 1. The slice 1 and portions 5 were coated with an intimate mixture of 1 part by weight of tris-(methylvinylsilylene diphosphate with 7 parts by weight of a polysiloxane mixture as hereinbefore defined in which the group R in the formulae of FIGS. 1 to 3 was a vinyl group. The processing of the coated slice to form the phosphosilicate glass portion 8 was carried out as described in Example 1, except that the exposure to electrons of the coating 6 was $10\mu$ C per sq. cm. and the treatment in wet oxygen lasted for 30 minutes.

Small capacitors were prepared as described in Example 1 and the form of the CV curves of these capacitors was similar to the form of the Example 1 CV curves.

Figure 2:
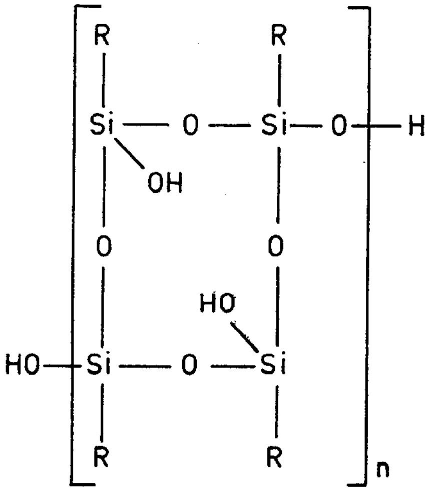

Example III relates to an embodiment for producing an apertured phosphosilicate glass layer superimposed upon an apertured silica layer of a substrate, comprising the steps of applying a layer comprising a polysiloxane mixture as described with reference to FIGS. 1, 2 and 3, to a substrate body, irradiating the layer with an electron beam which penetrates through the layer in accordance with a predetermined pattern, subsequently developing the layer until apertures in accordance with the pattern have been made in the layer, then depositing a coating of a mixture of a polyvinylsiloxane as hereinafter described and a tris-(organo-silylene) diphosphate over the apertures polysiloxane mixture pattern, then heating the coated substrate in an oxygen-free atmosphere to initiate graft polymerization of the material in the coating to the material in the layer, removing the unpolymerized areas of the coating by means of a solvent so as to open windows in the coating which are coincident with the apertures in the layer, then heating the coated substrate successively in an atmosphere comprising wet oxygen at 600°–700°C, in an inert atmosphere as hereinafter defined at 700°–850°C and in an inert atmosphere as hereinafter defined at 1,000°–1,100°C wherein the phosphorus content of the mixture of the polyvinylsiloxane mixture and the tris-(organo-silylene) disphosphate is from 1 to 15 atom % of the silicon content of the mixture, for instance, from 3 to 10 atom % of the silicon content of the mixture. Preferably the coating is deposited on the layer without undue delay after the development of the layer has been completed.

Figure 3:
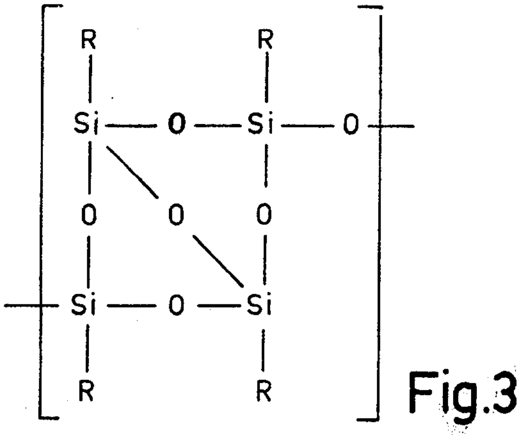
Figure 4:
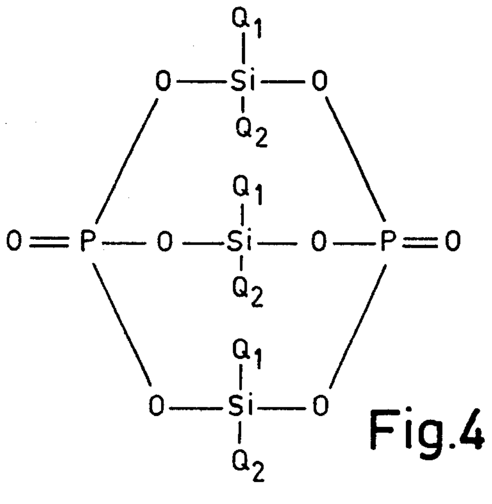
Figure 5:
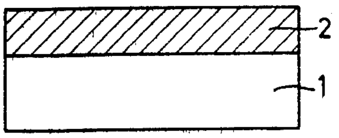
Figure 6:
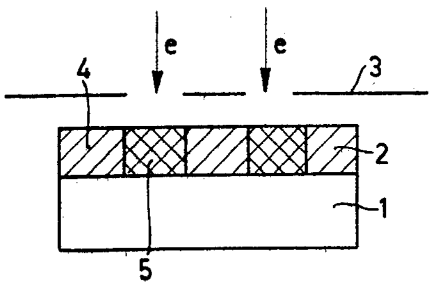
Figure 7:
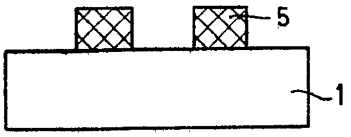
Figure 8:
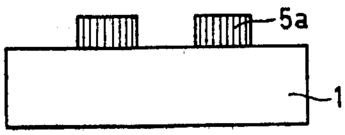
Figure 9:
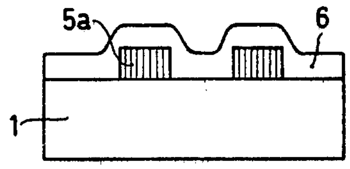
Figure 10:
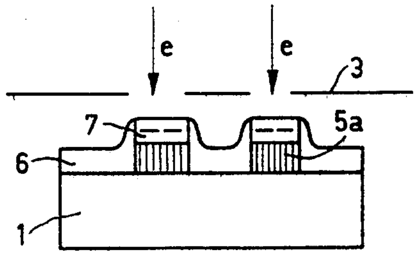
Figure 11:
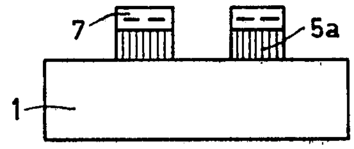
Figure 12:
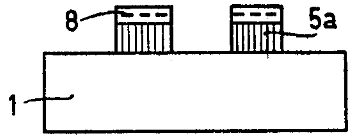

The polyvinylsiloxane of the phosphorus containing mixture is a polysiloxane mixture having a composition defined by the FIG. 3 formula in which at least one of the alkyl groups R is a vinyl group, any remaining alkyl groups R being methyl or ethyl.

Figure 13:
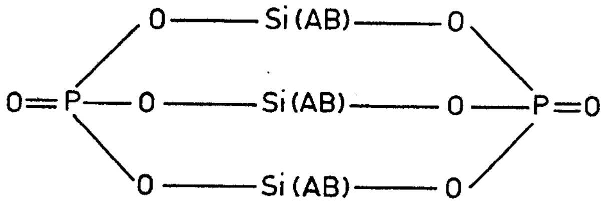
Figure 14:
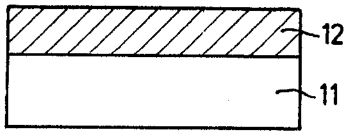
Figure 17:
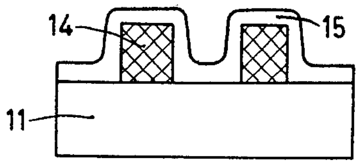
Figure 15:
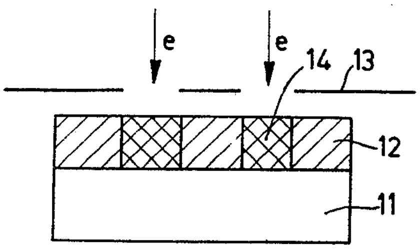
Figure 18:
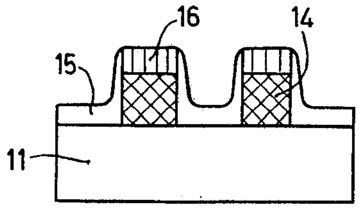
Figure 16:
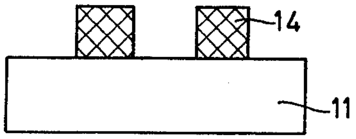
Figure 19:
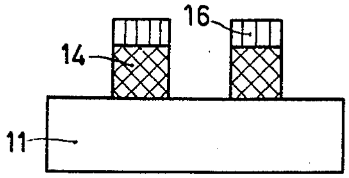
Figure 20:
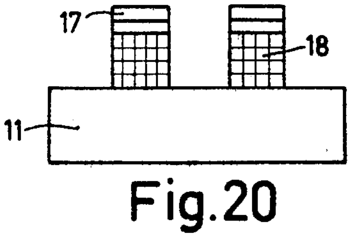

The tris-(organo-silylene) diphosphate is a compound having the general formula shown in FIG. 13 of the accompanying diagrammatic drawing, in which A represents methyl, vinyl or ethyl, and B represents a vinyl group.

The term "oxygen-free atmosphere" is used throughout this specification to signify an atmosphere which is substantially free from both elemental and combined oxygen. An "inert atmosphere" is understood to be an atmosphere which is inert with respect to silicon at the temperatures concerned.

Wet oxygen is an atmosphere of oxygen which has been substantially saturated with water vapor at a temperature T°C by passing the oxygen through water maintained at T°C. T may lie between room temperature and 100°C, and is generally preferred to be 95°C.

Electron beam irradiation of the polysiloxane mixture may be performed in an atmosphere containing up to 5 millitorrs of oxygen. The energy of the electrons used for the electron irradiation may be from 3 to 25 kV, but must be high enough for the electrons to penetrate through the layer to the substrate. The charge density used for irradiation of the layer may be from 75 to 1,200 microcoulombs per se. cm. and is preferably from 75 to 500 microcoulombs per sq. cm. and is preferably from 75 to 500 microcoulombs per sq. cm.

It appears that graft polymerisation of the material which constitutes the coating is initiated at active centers which are introduced into the layer by irradiation with the electron beam. The active centers may be free radicals or ions. Graft polymerisation is preferably initiated by heating at a temperature in the range from 80° to 150°C.

The embodiment of the present invention will now be described with reference to Example III and to FIGS. 14 to 20 of the accompanying drawings which schematically show successive stages in a method of producing a phosphorus-glass layer on a substrate by a method according to the present invention.

EXAMPLE III

A polysiloxane mixture was prepared by hydrolysing methyltrichlorosilane using the method described un our co-pending application 6884/71. A 25% by weight solution of this polysiloxane mixture was prepared in methyl isobutyl ketone.

A silicon slice 11(3–5 ohm. cm. N-type silicon) was cleaned by oxidising the slice, then removing the oxide by immersion in a 40% by weight hydrofluoric acid solution for 15 seconds followed by two 15 minute immersions in freshly prepared solutions which consisted of equal volumes of concentrated sulphuric acid (98% by weight and a 30% by weight solution of hydrogen peroxide). The slice was then rinsed in deionised water and was spun dry.

The slice 11 was coated with a 5000A thick layer 12 of the polysiloxane mixture by applying the above-mentioned solution of the polysiloxane mixture on to the slice 11 from a syringe and spinning the slice at 5,000 r.p.m. so as to remove the excess of the mixture. The layer 12 was irradiated with a 9 keV electron beam in accordance with a pattern defined by a mask 13 until the exposure was 250 $\mu$C per sq. cm. The apparatus used for the electron beam irradiation was of the type described in "Rapid direct formation of siliceous diffusion barriers by electron beams" by E. D. Roberts (p.571), at the 3rd International Conference on Electron and Ion Beam Service and Technology, Electrochemical Society Meeting, Boston, May 1968. Unirradiated portions of the layer 12 were removed by rinsing with acetone, the slice being spun dry, producing the arrangement shown in FIG. 16. The slice bearing the irradiated portions 14 was then immediately coated with a 1,000A thick coating 15 of a mixed solution having the following composition:

1 gm of a 35% by weight solution of tris-(methylvinyl-silylene) diphosphate in methylated spirit (94% ethanol).

10 gms of a 25% by weight solution of hydroxyl-free polyvinyl-cyclosiloxane mixture in methyl isobutyl ketone.

33 gms of methyl isobutyl ketone.

The atomic ratio of phosphorus to silicon in this mixture was 5 to 95; the phosphorus content of the mixture is thus 5.3 atom % of the silicon content.

The tris-(methylvinyl-silylene) diphosphate was prepared by slowly adding with stirring 20 gms of 90% orthophosphoric acid (sp. gr. 1.75) to 36 gms methylvinyldichlorosilane, the addition taking about an hour. The reaction is as follows:

$$3\ Me\ Vi\ Si\ Cl_2 + 2\ H_3PO_4 \rightarrow (Me\ Vi\ Si)_3(PO_4)_2 + 6H\ Cl\uparrow$$

wherein Vi represents a vinyl group and Me represents a methyl group. After all the orthophosphoric acid has been added, the reaction mixture was heated to 100°C and kept at that temperature for 6 hours. The residual hydrochloric acid was then removed by reducing the pressure to 1mm of mercury for 4 hours with the temperature at 100°C. The tris-(methylvinylsilylene) diphosphate was then found to be free from chlorine, was cooled and then dissolved in methylated spirit to give a 35% by weight solution. A polyvinylcyclosiloxane mixture was prepared by hydrolysing vinyltrichlorosilane using the method described in our co-pending application. Hydroxyl-free polyvinylcyclosiloxane for the mixture containing phosphorus may be prepared from the polyvinylcyclosiloxane mixture using the method described in United Kingdom Patent Specification 668,192. The polyvinylcyclosiloxane mixture was dissolved in Toluene and boiled with a 20% by weight aqueous solution of sodium hydroxide, the quantity of sodium hydroxide used being 1 g.m. equivalent of sodium hydroxide per 100 gm atoms of silicon in the mixture.

The slice 11 and portions 14 were provided with the coating 15 by applying the mixed solution from a syringe and removing the excess material by spinning at 6,000 r.p.m. Graft polymerization of the coating 15 in the areas overlying the portions 14 was initiated by immediately heating the slice for 10 minutes at 120°C in dry nitrogen. The slice was rinsed with methylated spirits so as to remove the unpolymerised portions of the coating 15 leaving polymerised portions 16 which consisted of a phosphorus-containing siloxane material. The slice was spun dry, heated for 30 minutes at 650°C in a 3 litres/minute current of wet oxygen so as to remove the organic matter from the portions 16 and 14. The wet oxygen was obtained by passing the oxygen through water at 90°C. The slice was then heated for 15 minutes at 800°C in a current of 3 litres/minute dry nitrogen followed by heat treatment of 15 minutes at 1,050°C in 3 litres/minute of dry nitrogen. This last-mentioned heat treatment is thought to densify the phosphosilicate glass layer 17 and the silica layer 18. The overall thickness of the layers 17 and 18 was approximately 3,000A.

Small MOS capacitors were made from the coated slice so produced, by evaporating on aluminum electrode on to the coating 17, the silicon slice 11 serving as the other electrode. The capacities of these capacitors were measured on a 150 kHz bridge with varying D.C. bias voltages applied. No hysteresis effects were observed furing D.C. bias voltage cycles. The capacity - D.C. bias voltage curves moved only slightly along the bias voltage axis when the capacitors were baked at 180°C for 30 minutes with ±9 volts D.C. applied across the capacitor before the curves were determined. In the absence of the coating 17, the curves move a considerable distance along the bias voltage axis.

Example IV relates to an embodiment of producing an apertured phosphosilicate glass layer on a substrate comprising the steps of applying a layer comprising a polysiloxane mixture as described with reference to FIGS. 1, 2 and 3 to the substrate, irradiating the layer with an electron beam which penetrates through the layer in accordance with a predetermined pattern, subsequently developing the layer until apertures in accordance with the pattern have been made in the layer, then allowing the layer to react with a halogen-phosphorus-containing compound as hereinafter defined until the film contains phosphorus in a quantity which is from 1 to 15 atom % of the silicon in the film, then heating the slice successively in an atmosphere comprising wet oxygen at 600°–700°C, in an inert atmosphere as hereinafter defined at 700°–850°C and in an inert atmosphere as hereinafter defined at 1,000°–1,100°C.

A halogen-phosphorus-containing compound is used of the class consisting of phosphorus oxyhalides or phosphorus halides in which the halogen is chlorine, bromine or iodine. Mixed halides and oxyhalides may be used. Preferably the halogen-phosphorus-containing compound is phosphorus oxychloride. The reaction may be conducted in the vapour phase, in which case the halogen-phosphorus-containing compound is diluted with a carrier gas, for example nitrogen. Preferably a solution of the halogen-phosphorus-containing compound is used to treat the layer, the solvent being inert with respect to the halogen-phosphorus-containing compound.

Wet oxygen is an atmosphere of oxygen which has been substantially saturated with water vapour at temperature T°C by passing the oxygen through water maintained at T°C. T may lie between room temperature and 100°C, and is generally preferred to be 95°C.

Electron beam irradiation of the polysiloxane mixture may be performed in an atmosphere containing up to 5 millitorrs of oxygen. The energy of the electrons used for the electron irradiation may be from 3 to 25 kV, but must be high enough for the electrons to penetrate through the layer to the substrate. The charge density used for irradiation of the layer may be from 75 to 1,200 microcoulombs/sq.cm. and is preferably from 75 to 500 microcoulombs/sq.cm.

Figure 21:
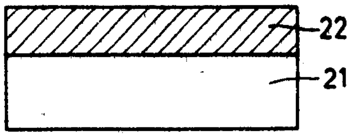
Figure 22:
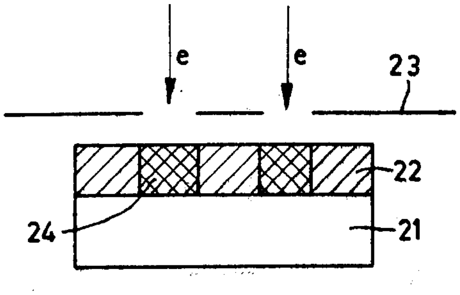
Figure 23:
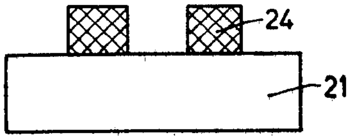

This embodiment of the present invention will now be described with reference to the following Example IV and to FIGS. 21 to 23 of the accompanying drawings which schematically show successive stages in a method of producing a phosphosilicate glass layer on a substrate by a method according to the present invention.

EXAMPLE IV

A polysiloxane mixture was prepared by hydrolysing methyltrichlorosilane using the method described in our co-pending application. A 25% by weight solution of the polysiloxane mixture was prepared in methyl isobutyl ketone.

A silicon slice 21 (3–5 ohm.cm. N-type silicon) was cleaned by oxidising the slice, then removing the oxide by immersion in a 40% by weight hydrofluoric acid solution for 15 seconds followed by two 15 minute immersions in freshly prepared solutions which consisted of equal volumes of concentrated sulphuric acid (98% by weight) and a 30% by weight solution of hydrogen peroxide. The slice was then rinsed in deionised water and was spun dry.

The slice 21 was coated with a 5,000A thick layer of 22 of the polysiloxane mixture by applying the above-mentioned solution of the polysiloxane mixture on to the slice 21 from a syringe and spinning the slice at 5,000 r.p.m. so as to remove the excess of the mixture. The layer 22 was irradiated with a 9 keV electron beam in accordance with pattern defined by a mask 23 until the exposure was 250 $\mu$ C per sq. cm. The apparatus used for the electron beam irradiation was of the type described in "Rapid direct formation of siliceous barriers by electron beams" by E. D. Roberts (p.571) at the 3rd International Conference on Electron and Ion Beam Service and Technology, Electrochemical Society Meeting, Boston, May 1968. Unirradiated portions of the layer 22 were removed by rinsing with acetone, the slice then being spun dry, producing the arrangement shown in FIG. 23. Different slices bearing the irradiated portions 24 were immersed in a 10% V/V solution of phosphorus oxychloride in diethyl either for 1 minute, 3 minutes and 5 minutes respectively at 18°C. The slices were then rinsed in ether and were blown dry. Each slice was heated for 30 minutes at 650°C in oxygen which had been saturated with water vapour at 95°C, then in dry nitrogen for 15 minutes at 800°C and finally for 15 minutes in dry nitrogen at 1,050°C. These heat treatments converted the phosphorus-containing siloxane material formed by chemical reaction between the siloxane material 24 on the slices into a phosphosilicate glass.

Small MOS capacitors were made from the coated slice so produced, by evaporating an aluminium electrode on to the coating 24, the silicon slice 21 serving as the other electrode. The capacities were measured on a 150 kHz bridge with varying D.C. bias voltages applied. No hysteresis effects were observed during D.C. bias voltage cycles. The capacity - D.C. bias voltage curves moved only slightly along the bias voltage axis when the capacitors were baked at 180°C for 30 minutes with ±9 volts D.C. applied across the capacitor, before the curves were determined. In the absence of treatment with the phosphorus oxychloride solution, the curves move a considerable distance along the bias voltage axis.

What is claimed is:

1. A method of producing a phosphosilicate glass pattern on a substrate, said method comprising forming a layer of a polysiloxane and a phosphorus containing compound on a substrate, subjecting said layer to irradiation according to a predetermined pattern in order to effect the solubility of the portion of said layer corresponding to said predetermined pattern in a developer, treating said irradiated layer with said developer to thereby remove the portion of said layer corresponding to said pattern and then heating said resultant patterned layer to thereby convert said polysiloxane and phosphorus compound layer to a phosphosilicate glass.

2. A method as claimed in claim 1, characterized in that the substrate comprises a semiconductor.

3. A method as claimed in claim 2, characterized in that the semiconductor is silicon.

4. A method of claim 3, characterized in that the layer pattern comprising polysiloxane and a phosphorus containing compound is formed on a substrate having at least a partially intermediate layer of silicon oxide.

5. A method as claimed in claim 4, characterized in that the layer of silicon oxide is formed by conversion of a polysiloxane.

6. A method as claimed in claim 3, characterized in that the layer pattern comprising polysiloxane and a phosphorus containing compound is formed on a substrate having at least a partial layer of a polysiloxane.

7. A method as claimed in claim 4, characterized in that the layer of silicon oxide or of a material convertable to silicon oxide is formed according to a predetermined pattern before the formation of the layer pattern comprising polysiloxane and phosphorus.

8. A method as claimed in claim 1, characterized in that the pattern is obtained by irradiating at selected areas.

9. A method as claimed in claim 8, characterized in that the pattern is obtained by irradiation with an electron beam.

10. A method as claimed in claim 8, characterized in that the polysiloxane employed behaves differently against removal with a suitable liquid when having been exposed to the irradiation as compared to the unirradiated polysiloxane.

11. A method of claim 1 characterized in that the polysiloxane comprises cyclosiloxane rings.

12. A method as claimed in claim 11, characterized in that the polysiloxane comprises cyclotrisiloxane rings.

13. A method as claimed in claim 11, characterized in that the polysiloxane comprises cyclotetrasiloxane rings.

14. A method as claimed in claim 11, characterized in that the silicon atoms of the rings are bonded to aliphatic groups.

15. A method as claimed in claim 14, characterized in that the aliphatic groups are chosen from the class of methyl, ethyl and vinyl groups.

16. A method as claimed in claim 11 characterized in that at least part of the rings are bonded to each other by means of oxygen bridges.

17. A method as claimed in claim 16 characterized in that the polysiloxane comprises an at least partly polymerized mixture of 2,4,6 tri-organyl, 2,4,6 trihydroxy cyclotrisiloxane and 2,4,6,8 tetraorganyl, 2,4,6,8 tetrahydroxy-cyclotetrasiloxane in which part of the hydroxy groups bonded to opposing silicon atoms in the cyclotetrasiloxane rings may be replaced by oxygen bridges and the organyl groups are aliphatic groups.

18. A method as claimed in claim 1, characterized in that the phosphorus compound is introduced in an already deposited polysiloxane layer.

19. A method as claimed in claim 18, characterized in that the phosphorus compound is introduced from the gaseous phase.

20. A method as claimed in claim 18, characterized in that the phosphorus compound is introduced from a liquid phase.

21. A method as claimed in claim 18 characterized in that the phosphorus compound contains halogen.

22. A method as claimed in claim 21, characterized in that the compound is phosphorus oxychloride.

23. A method of claim 18 characterized in that the polysiloxane layer is confined to the predetermined pattern before introducing the phosphorus compound into it.

24. A method of claim 1, characterized in that the phosphorus compound is codeposited with the polysiloxane onto the substrate.

25. A method as claimed in claim 24, characterized in that the compound contains phosphorus bonded to oxygen.

26. A method as claimed in claim 25, characterized in that the compound comprises silicon.

27. A method as claimed in claim 26, characterized in that the compound comprises organic groups.

28. A method as claimed in claim 27, characterized in that the organic groups are aliphatic groups.

29. A method as claimed in claim 28, characterized in that the aliphatic groups are of the class of methyl, ethyl and vinyl groups.

30. A method as claimed in claim 29, characterized in that the organic groups are bonded to silicon.

31. A method as claimed in claim 30 characterized in that the compound is tri- (di-organosilylene) diphosphate in which "organo" stands for the organic groups.

32. A method as claimed in claim 24, characterized in that the substrate is formed with a layer pattern comprising polysiloxane subjected to irradiation according to said pattern after which the codeposition of the phosphorus compound and polysiloxane is performed onto the substrate and the co-deposited material is further polymerized according to the desired pattern by graft-polymerisation induced by the irradiated material of the polysiloxane underneath said layer according to the said irradiated pattern after which the portions of the codeposited layer which were not subjected to the graft-polymerization are removed.

33. A method as claimed in claim 32, characterized in that the polysiloxane codeposited with the phosphorus compound comprises vinyl groups.

34. A method as claimed in claim 32, characterized in that the graft-polymerization is carried out by heating in an oxygen-free atmosphere.

35. A device, more specially a semiconductor device, comprising s phosphate glass layer pattern as produced by a method as claimed in claim 1.

* * * * *